United States Patent [19]

Cullen

[11] Patent Number: 5,784,865
[45] Date of Patent: *Jul. 28, 1998

[54] TRUCK-MOUNTED AGRICULTURAL FEED BAGGING MACHINE

[75] Inventor: Steven R. Cullen, Astoria, Oreg.

[73] Assignee: Versa Corp.

[*] Notice: The portion of the term of this patent subsequent to Mar. 29, 2011, has been disclaimed.

[21] Appl. No.: 326,467

[22] Filed: Oct. 20, 1994

Related U.S. Application Data

[63] Continuation of Ser. No. 200,757, Feb. 22, 1994.

[51] Int. Cl.⁶ .................. B65B 9/10; B65B 1/24
[52] U.S. Cl. .................. 53/567; 53/527
[58] Field of Search .................. 53/390, 527, 529, 53/530, 567; 56/16.6; 100/100

[56] References Cited

U.S. PATENT DOCUMENTS

| | | | |
|---|---|---|---|
| 3,791,593 | 2/1974 | Griffin | 239/667 |
| 4,095,398 | 6/1978 | Aumann et al. | 56/16.6 |
| 4,168,600 | 9/1979 | Klug et al. | 56/16.6 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,621,666 | 11/1986 | Ryan | 100/100 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,945,715 | 8/1990 | Brodrecht | 53/567 |
| 4,949,633 | 8/1990 | Johnson et al. | 100/65 |
| 5,018,344 | 5/1991 | Samejima et al. | 56/16.6 |
| 5,159,877 | 11/1992 | Inman et al. | 100/144 |
| 5,269,829 | 12/1993 | Meyer | 71/9 |
| 5,287,684 | 2/1994 | Beroth | 56/16.6 |
| 5,295,554 | 3/1994 | Cullen | 180/236 |
| 5,297,377 | 3/1994 | Cullen | 53/567 |
| 5,355,659 | 10/1994 | Cullen | 53/567 |
| 5,367,860 | 11/1994 | Cullen | 53/567 |

*Primary Examiner*—John Sipos
*Assistant Examiner*—Rodney Butler
*Attorney, Agent, or Firm*—Zarley, McKee, Thomte, Voorhees & Sease; Dennis L. Thomte

[57] ABSTRACT

A truck-mounted agricultural bagging machine is disclosed comprising a substantially conventional bagging machine mounted on the rear end of a truck. The bagging machine is powered by the truck engine. The truck may quickly and easily transport the bagging machine from one location to another.

7 Claims, 2 Drawing Sheets

TRUCK-MOUNTED AGRICULTURAL FEED BAGGING MACHINE

This is a continuation of copending application Ser. No. 08/200,757 filed on Feb. 22, 1994.

BACKGROUND OF THE INVENTION

1. Field of the Invention

This invention relates to an agricultural feed bagging machine and more particularly to an agricultural feed bagging machine which is mounted on the rear end of a vehicle such as a truck or the like.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled.

In all of the prior art bagging machines of which applicant is aware, the bagging machines are either mounted on skids or are mounted on a wheeled frame means. In those prior art bagging machines, the bagging machine must be pulled by a tractor, truck or the like from one location to another when it is desired to transport the bagging machine. Thus, in the prior art bagging machines, it is required that a separate vehicle be available to move the bagging machine from one location to another. Further, a tractor cannot move the bagging machine to a distant location in a rapid fashion.

SUMMARY OF THE INVENTION

A truck-mounted agricultural feed bagging machine is disclosed wherein a feed bagging machine is mounted on the rear end of the truck. The rotor of the bagging machine is operatively connected to a truck-mounted gearbox which is operatively connected to the power system of the truck. Thus, the truck provides the power for the bagging machine and provides a very rapid means for transporting the bagging machine from one location to another.

It is therefore a principal object of the invention to provide a truck-mounted agricultural feed bagging machine.

A further object of the invention is to provide an agricultural feed bagging machine which is mounted on the rear end of a truck and which is powered thereby.

Still another object of the invention is to provide an agricultural feed bagging machine which is mounted on the rear end of a truck to enable the bagging machine to be quickly and easily moved from one location to another.

These and other objects will be apparent to those skilled in the art.

DESCRIPTION OF THE PREFERRED EMBODIMENT

The numeral 10 refers to a conventional vehicle such as a truck or the like having a frame means 12 and an operator's cab 14. The numeral 16 refers to an agricultural feed bagging machine which is substantially conventional in design except that it is mounted on the truck and is powered thereby.

Figure 1:
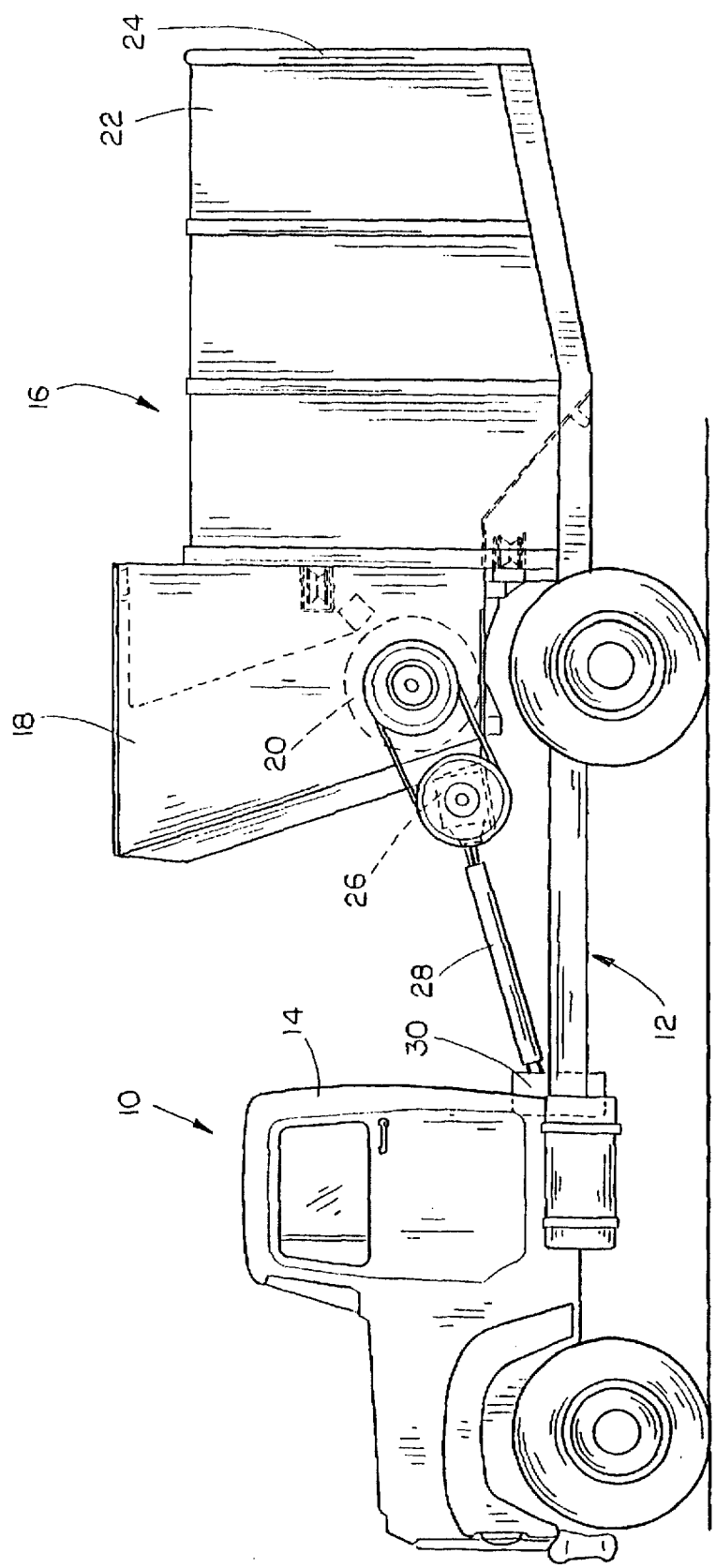
FIG. 1 is a side view of the truck-mounted agricultural bagging machine of this invention.
Figure 2:
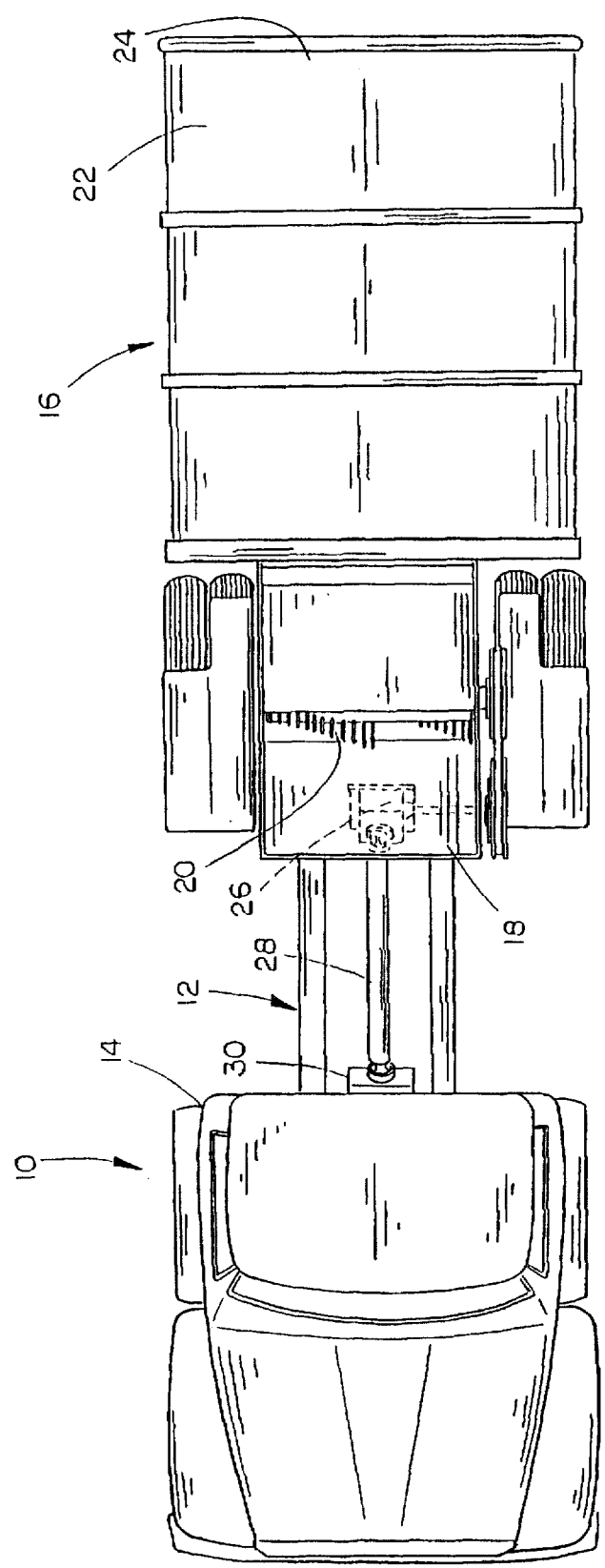
FIG. 2 is a top view of the truck-mounted agricultural bagging machine of this invention.

Bagging machine 16 includes a hopper 18 at the forward end thereof. A horizontally disposed rotor 20 is provided on the bagging machine and is in operative communication with the hopper 18 to enable the silage material or the like to be forced rearwardly from the hopper 18 into the rearwardly extending tunnel 22. As seen in FIG. 1, the rear end 24 of the tunnel 22 is positioned substantially rearwardly of the truck. Further, substantially the entire length of the tunnel 22 is mounted rearwardly of the rearward end of the truck to enable the positioning of an agricultural bag thereon without interference from the truck frame.

The numeral 26 refers to a right angle gearbox which is mounted at the forward end of the machine 16 at the center thereof and which has a drive line 28 extending therefrom which is operatively connected to a truck-mounted gearbox 30 powered by the truck engine. Gearbox 26 is operatively connected to the rotor 20 and any other machine components requiring power.

In field operation, the truck engine of the truck powers the bagger so that silage or the like in the hopper 18 is packed into the agricultural bag mounted on the tunnel 22. As the agricultural bag is being filled, the truck will be pushed forwardly by the filling action of the bag in conventional fashion. During the bagging operation, the operator may remain in the cab 14 if desired. When it is desired to transport the bagging machine 16 from one location to another, the gearbox 30 will normally be disconnected or disengaged. The truck can then quickly transport the bagging machine 16 from one location to another in a convenient fashion.

Thus it can be seen that the invention accomplishes at least all of its stated objectives.

I claim:

1. In combination:

a self-propelled vehicle including wheeled frame means having an engine and all operator's cab mounted thereon, said vehicle having rearward and forward ends and a rear frame portion;

and an agricultural feed bagging machine positioned on and supported by said rear frame portion of said vehicle for bagging agricultural feed material into agricultural bags having an open mouth;

said bagging machine comprising a frame means positioned on and supported by said rear frame portion; a tunnel on said frame means having an intake end for receiving the material to be bagged and an output end adapted to receive the open mouth of the agricultural bag; a hopper on said frame means forwardly of said tunnel for receiving the material to be bagged; and a horizontally disposed rotor rotatably mounted on said frame means at the intake end of said tunnel for forcing the material to be bagged from said hopper into said tunnel and into said bag, the pressure of the material forced into said bag urging said vehicle forwardly as said rotor fills said bag.

2. The combination of claim 1 wherein said tunnel protrudes rearwardly from the rearward end of said vehicle to enable the bag to be positioned thereon.

3. The combination of claim 2 wherein substantially all of said tunnel is positioned rearwardly of the rearward end of said vehicle.

4. In combination with a truck including a wheeled frame means having rearward and forward ends, an engine on said frame means at the forward end thereof, an operator's cab on said frame means, said frame means including a rear frame portion which extends rearwardly from said operator's cab, comprising:

an agricultural bagging machine positioned on and supported by said rear frame portion of said truck for bagging agricultural material into agricultural bags having an open mouth and a ground supported closed end;

said bagging machine comprising a frame means which is positioned on and supported by said rear frame portion of said wheeled frame means; a tunnel on said frame means having an intake end for receiving the material to be bagged and an output end adapted to receive the open mouth of the agricultural bag; a hopper on said frame means forwardly of said tunnel for receiving the material to be bagged; and a horizontally disposed rotor rotatably mounted on said frame means at the intake end of said tunnel for forcing the material to be bagged from said hopper into said tunnel and into said bag, the pressure of the material forced into said bag urging said truck forwardly as said rotor fills said bag.

5. The combination of claim 4 wherein said rotor is driven by said truck engine.

6. The combination of claim 4 wherein said tunnel protrudes rearwardly from the rearward end of said truck to enable the bag to be positioned thereon without interference from the truck.

7. The combination of claim 6 wherein substantially all of said tunnel is positioned rearwardly of the rearward end of said truck.

* * * * *